(12) United States Patent
Clark et al.

(10) Patent No.: US 11,393,085 B2
(45) Date of Patent: Jul. 19, 2022

(54) IMAGE ANALYSIS USING MACHINE LEARNING AND HUMAN COMPUTATION

(71) Applicants: Southern Methodist University, Dallas, TX (US); Retina Foundation of the Southwest, Dallas, TX (US)

(72) Inventors: Corey Clark, Plano, TX (US); Karl Csaky, Dallas, TX (US)

(73) Assignees: Southern Methodist University, Dallas, TX (US); Retina Foundation of the Southwest, Dallas, TX (US)

( * ) Notice: Subject to any disclaimer, the term of this patent is extended or adjusted under 35 U.S.C. 154(b) by 47 days.

(21) Appl. No.: 16/538,662

(22) Filed: Aug. 12, 2019

(65) Prior Publication Data

US 2020/0051241 A1 Feb. 13, 2020

Related U.S. Application Data

(60) Provisional application No. 62/717,681, filed on Aug. 10, 2018.

(51) Int. Cl.
*G06T 7/00* (2017.01)
*G06N 20/00* (2019.01)
*G06T 7/11* (2017.01)

(52) U.S. Cl.
CPC .......... *G06T 7/0012* (2013.01); *G06N 20/00* (2019.01); *G06T 7/11* (2017.01); *G06T 2207/20081* (2013.01)

(58) Field of Classification Search
CPC .......... G06N 20/00; G06T 2207/10101; G06T 2207/20081; G06T 2207/20104;
(Continued)

(56) References Cited

U.S. PATENT DOCUMENTS

2011/0301447 A1* 12/2011 Park ...................... G06T 7/0016
600/407
2017/0046833 A1* 2/2017 Lurie ...................... G06T 5/008
(Continued)

FOREIGN PATENT DOCUMENTS

WO 2017165566 A1 9/2017

OTHER PUBLICATIONS

Fujii et al., "Histopathological validation of optical coherence tomography findings of the coronary arteries", Journal of Cardiology, vol. 72, No. 3, Sep. 2018, pp. 179-185.
(Continued)

*Primary Examiner* — David Bilodeau (57) ABSTRACT

Methods, systems, and computer readable media for analyzing an image using machine learning and human computation. A method for analyzing an image includes providing, via multiple instances of an interactive application for analysis of the image, multiple instances, respectively, of the image and receiving, via the interactive application, data from results of analyses of the image including multiple sets of user inputs from the analyses of the multiple instances of the image, respectively. The multiple sets of user inputs are from multiple users, respectively and the multiple users are associated with the multiple instances of the interactive application, respectively. The method further includes processing the received data to identify areas of interest within the image based on the multiple sets of user inputs and analyzing the image using a machine learning algorithm to identify structures in the image based on the identified areas of interest within the image.

24 Claims, 6 Drawing Sheets

(58) Field of Classification Search
CPC ......... G06T 2207/30041; G06T 7/0012; G06T 7/0016; G06T 7/11
See application file for complete search history.

(56) References Cited

U.S. PATENT DOCUMENTS

| | | | |
|---|---|---|---|
| 2018/0060512 A1 | 3/2018 | Sorenson et al. | |
| 2018/0064335 A1* | 3/2018 | Rutschman | H04N 21/2393 |
| 2018/0137244 A1* | 5/2018 | Sorenson | G16H 30/20 |
| 2018/0144214 A1* | 5/2018 | Hsieh | G06N 3/08 |
| 2018/0144466 A1* | 5/2018 | Hsieh | G06T 7/0012 |
| 2019/0029623 A1* | 1/2019 | Kunio | A61B 6/5211 |
| 2019/0392942 A1* | 12/2019 | Sorenson | G06F 19/321 |
| 2021/0137384 A1* | 5/2021 | Robinson | G16H 10/60 |

OTHER PUBLICATIONS

Lee et al., "Use of Mechanical Turk as a MapReduce Framework for Macular OCT Segmentation", Journal of Opthalmology, vol. 2016, May 2016, 6 pages.
ISA/US, International Search Report and Written Opinion of the International Searching Authority, International Application No. PCT/US2019/046233, dated Nov. 13, 2019, 7 pages.
Extended European Search Report dated Mar. 10, 2022 regarding Application No. 19847194.8, 11 pages.
Bogunović et al., "Machine Learning of the Progression of Intermediate Age-Related Macular Degeneration Based on OCT Imaging", Investigative Ophthalmology & Visual Science, vol. 58, No. 6, Jun. 2017, pp. BIO141-BIO150.

* cited by examiner

IMAGE ANALYSIS USING MACHINE LEARNING AND HUMAN COMPUTATION

CROSS-REFERENCE TO RELATED APPLICATIONS AND CLAIM OF PRIORITY

The present application claims priority to U.S. Provisional Patent Application Ser. No. 62/717,681, filed on Aug. 10, 2018. The content of the above-identified patent documents is incorporated herein by reference.

TECHNICAL FIELD

This disclosure relates generally to image analysis. More specifically, this disclosure relates to the use of machine learning and human computation in image analysis.

BACKGROUND

Machine learning or artificial intelligence is being applied in the area of medical research, particularly in areas of research where large amounts of data need to be collected and analyzed. Using adaptive redundant algorithms, machine learning is able to analysis thousands to millions of individual data sets and detect patterns within these large data sets that normally would be impossible or impractical to analyze given the scope.

Age-related macular degeneration (AMD) is the leading cause of visual impairment for people over age 50 in the developed world. In the retina, the macula is where the eye processes detailed vision. As part of the complex anatomic features of AMD, deposits known as drusen form between the retinal pigment epithelium (RPE) and Bruch's membrane. However, this is only one of a myriad of anatomic pathologies that are associated with AMD. While there is no known cure for AMD, some treatments have shown promise in slowing disease progression. One of the major obstacles to the development of an effective treatment is the inability to detect objective criteria that would either herald further progression of the disease or identify aspects that suggest improvement in patients undergoing treatment.

Optical coherence tomography (OCT) is a key tool in the diagnosis and treatment evaluation of AMD. OCT is a non-invasive imaging method utilizing light to provide high-resolution cross-sections of the neurosensory retina. OCT measures light waves reflected and scattered by the retinal tissue. Analysis of the cross-sections allows researchers to identify drusen and other anatomic features of AMD and would potentially allow researchers to monitor the progression of AMD in response to treatment.

BRIEF DESCRIPTION OF THE DRAWINGS

For a more complete understanding of the present disclosure and its advantages, reference is now made to the following description taken in conjunction with the accompanying drawings, in which like reference numerals represent like parts.

SUMMARY

Embodiments of the present disclosure provide for analyzing an image using machine learning and human computation.

In one embodiment, a method for analyzing an image is provided. The method includes providing, via multiple instances of an interactive application for analysis of the image, multiple instances, respectively, of the image and receiving, via the interactive application, data from results of analyses of the image including multiple sets of user inputs from the analyses of the multiple instances of the image, respectively. The multiple sets of user inputs are input via the multiple instances of the interactive application, respectively; the multiple sets of user inputs are from multiple users, respectively; and the multiple users are associated with the multiple instances of the interactive application, respectively. The method further includes processing the received data to identify one or more areas of interest present within the image based on the multiple sets of user inputs and analyzing the image using a machine learning algorithm to identify one or more structures present in the image based on the identified one or more areas of interest present within the image.

In another embodiment, a system for analyzing an image is provided. The system includes a communication interface and a processor operably connected to the communication interface. The communication interface is configured to provide, via multiple instances of an interactive application for analysis of the image, multiple instances, respectively, of the image and receive, via the interactive application, data from results of analyses of the image including multiple sets of user inputs from the analyses of the multiple instances of the image, respectively. The multiple sets of user inputs are input via the multiple instances of the interactive application, respectively; the multiple sets of user inputs are from multiple users, respectively; and the multiple users are associated with the multiple instances of the interactive application, respectively. The processor is configured to process the received data to identify one or more areas of interest present within the image based on the multiple sets of user inputs and analyze the image using a machine learning algorithm to identify one or more structures present in the image based on the identified one or more areas of interest present within the image.

In yet another embodiment, a non-transitory, computer-readable medium for analyzing an image is provided. The computer-readable medium comprises program code that, when executed by a processor of a system, causes the system to provide, via multiple instances of an interactive application for analysis of the image, multiple instances, respectively, of the image and receive, via the interactive application, data from results of analyses of the image including multiple sets of user inputs from the analyses of the multiple instances of the image, respectively. The multiple sets of user inputs are input via the multiple instances of the interactive application, respectively; the multiple sets of user inputs are from multiple users, respectively; and the multiple users are associated with the multiple instances of the interactive application, respectively. The computer-readable medium further comprises program code that, when executed by a processor of a system, causes the system to process the received data to identify one or more areas of interest present within the image based on the multiple sets of user inputs and analyze the image using a machine learning algorithm to identify one or more structures present in the image based on the identified one or more areas of interest present within the image.

Other technical features may be readily apparent to one skilled in the art from the following figures, descriptions, and claims.

DETAILED DESCRIPTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Various embodiments of the present disclosure recognize that automated image evaluation procedures exist and continue to improve but have yet to provide a comprehensive solution, and often require verification or modification by a trained evaluator. Embodiments of the present disclosure further recognize the technical problem that automated solutions frequently misidentify anatomic boundaries, particularly with deformations such as, for example, those created by drusen as well as anatomic features that represent degenerative features of the retina. While research continues into improving automated techniques, trained OCT evaluators are often employed to manually evaluate or correct the analysis. Embodiments of the present disclosure recognize that medical imaging, such as OCT, has become widespread, with millions of scans performed per year, and the number expected to continue to increase with the large aging population. Embodiments of the present disclosure recognize that a limited number of trained image evaluators exist and demand for new evaluation approaches is increasing.

Various embodiments of the present disclosure recognize that human computing has proven to be an effective way to crowdsource a variety of scientific problems, as well as leverage human pattern-recognition ability. Human computing can be used to collect data (e.g., gathering or generating samples), perform human calculation problems (such as solving challenges as a replacement for all or part of an algorithm), or provide human analysis (e.g., classification, data verification). Embodiments of the present disclosure recognize that video games allow users to interact with the scientific data while also leveraging the elements game developers require to maintain engagement.

Accordingly, various embodiments of the present disclosure provide image analysis solutions that utilize video games to gain human intuition and leverage that human intuition in connection with machine learning to correctly identify structures (or the absence thereof) in an image.

Figure 1:
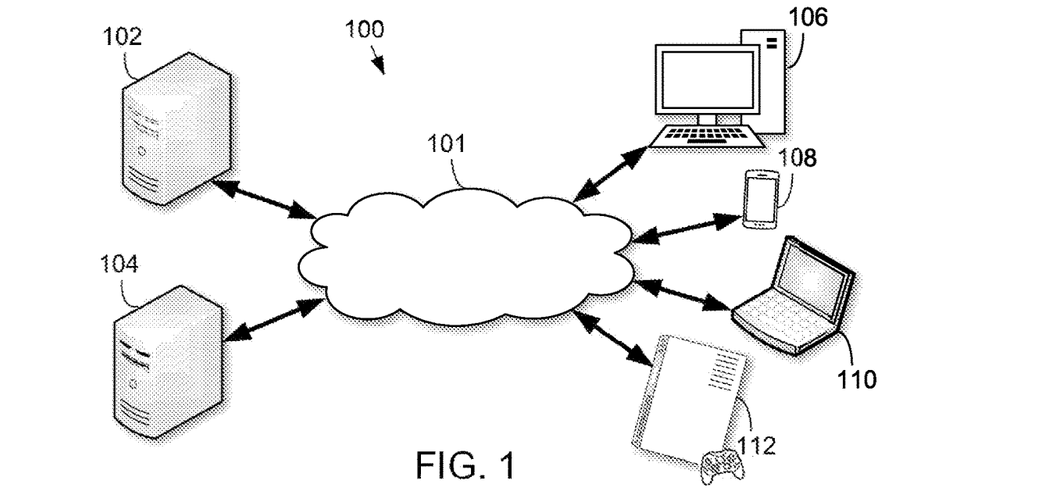
FIG. 1 illustrates an example networked system in which various embodiments of the present disclosure may be implemented.

FIG. 1 illustrates an example networked system 100 in which various embodiments of the present disclosure may be implemented. The embodiment of the networked system 100 shown in FIG. 1 is for illustration only. Other embodiments of the networked system 100 could be used without departing from the scope of this disclosure.

As shown in FIG. 1, the system 100 includes a network 101, which facilitates communication between various components in the system 100. For example, the network 101 may communicate Internet Protocol (IP) packets or other information between network addresses. The network 101 may include one or more local area networks (LANs); metropolitan area networks (MANs); wide area networks (WANs); a virtual private network (VPN); all or a portion of a global network, such as the Internet; or any other communication system or systems at one or more locations.

The network 101 facilitates communications among various computer systems 102-104 and various user computing devices 106-112. Each of the computer systems 102-104 may be any suitable electronic computing or processing device(s) that can provide computing services including software for one or more user computing devices 106-112. Each of the computer systems 102-104 could, for example, include one or more processing devices, one or more memories storing instructions and data, and one or more network interfaces facilitating communication over the network 101. For example, as discussed in greater detail below, computer system 102 may be a computer system for a researcher or data processor that is used to run machine learning algorithms that leverage human intuition to correctly identify structures (or the absence thereof) in an image. Additionally, computer system 104 may be associated with a medical provider or researcher to supply images for analysis and receive the results thereof.

Each user computing device 106-112 represents any suitable electronic computing or processing device that interacts with at least one computer system or other computing device(s) over the network 101. In this example, the user computing devices 106-112 include a desktop computer 106, a mobile telephone or smartphone 108, a laptop computer 110, a video game console 112; a set-top box and/or television, etc. However, any other or additional user computing devices could be used in the networked system 100. For example, any Internet or network connectable device or Internet of Things (IoT) device (e.g., Smart TVs, refrigerators, Raspberry PIs, etc.) could be used for one of the user computing devices 106-112 in system 100. As discussed below, in various embodiments, user computing devices 106-112, may be employed to provide a video game that drives user engagement to provide human intuition to help identify structures in images.

Although FIG. 1 illustrates one example of a networked system 100, various changes may be made to FIG. 1. For example, the system 100 could include any number of each component in any suitable arrangement and each of computer systems 102-104 and user computing devices 106-112 may be representative of any number of computer systems and/or user computing devices that are part of system 100. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
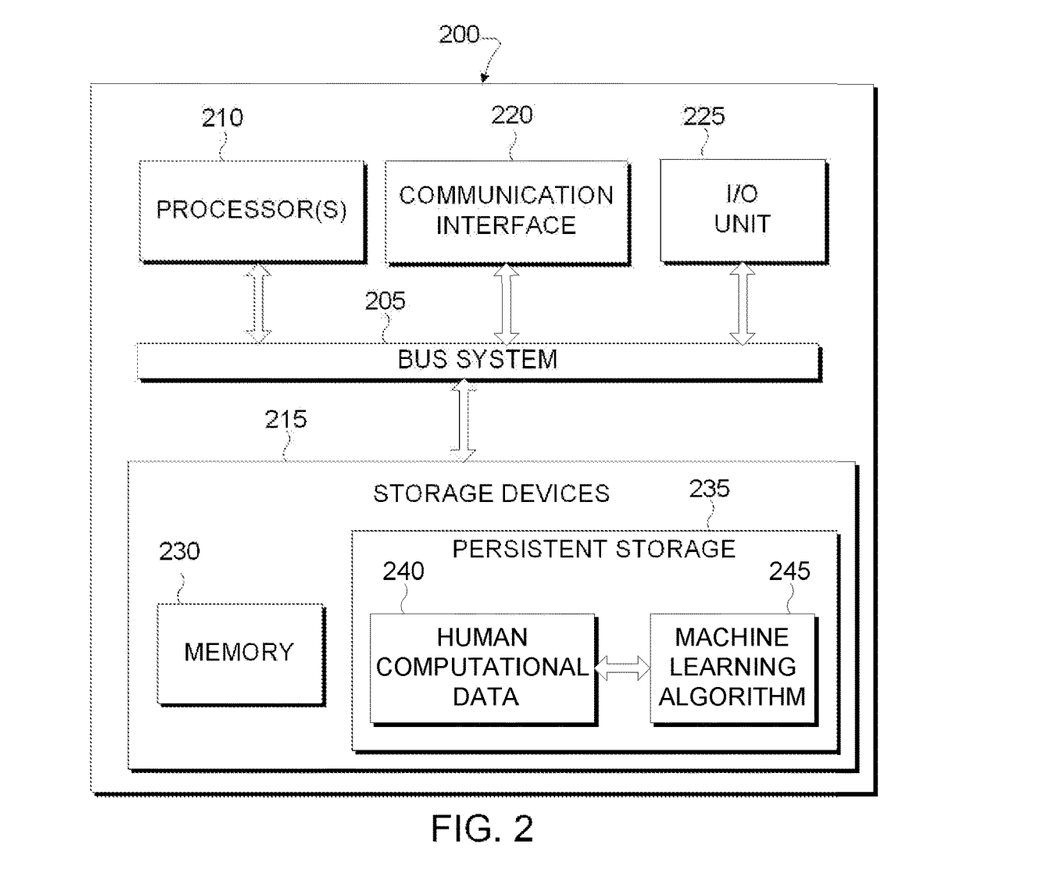
FIG. 2 illustrates an example of a computer system in which various embodiments of the present disclosure may be implemented.
Figure 3:
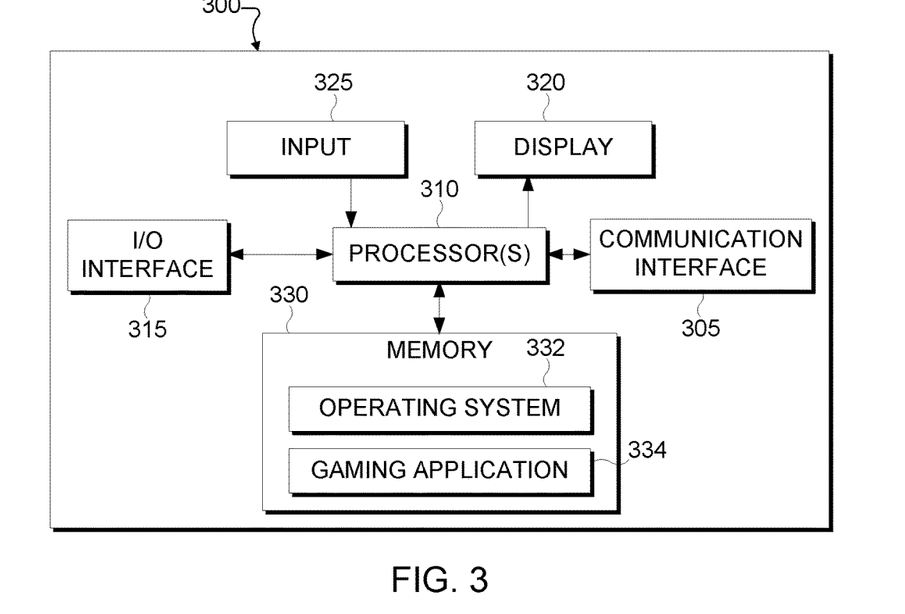
FIG. 3 illustrates an example of a user computing device in which various embodiments of the present disclosure may be implemented.

FIGS. 2 and 3 illustrate example computing devices in a networked system according to various embodiments of the present disclosure. In particular, FIG. 2 illustrates an example computer system 200, and FIG. 3 illustrates an example user computing device 300. In this illustrative example, the computer system 200 represents any one of the computer systems 102-104 in FIG. 1, and the user computing device 300 could represent one or more of the user computing devices 106-112 in FIG. 1.

As shown in FIG. 2, the computer system 200 includes a bus system 205, which supports communication between processor(s) 210, storage devices 215, communication interface (or circuit) 220, and input/output (I/O) unit 225. The processor(s) 210 executes instructions that may be loaded into a memory 230. The processor(s) 210 may include any suitable number(s) and type(s) of processors or other devices in any suitable arrangement. Example types of processor(s) 210 include microprocessors, microcontrollers, digital signal processors, field programmable gate arrays, application specific integrated circuits, and discrete circuitry.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random-access memory or any other suitable volatile or non-volatile storage device(s). The persistent storage 235 may contain one or more components or devices supporting longer-term storage of data, such as a read-only memory, hard drive, Flash memory, or optical disc. For example, persistent storage 235 may store images for analysis, human computational data 240 (such as training data representing human intuition inputs), and/or a machine learning algorithm 245 to process the images.

The communication interface 220 supports communications with other systems or devices. For example, the communication interface 220 could include a network interface card or a wireless transceiver facilitating communications over the network 101. The communication interface 220 may support communications through any suitable physical or wireless communication link(s). The I/O unit 225 allows for input and output of data. For example, the I/O unit 225 may provide a connection for user input through a keyboard, mouse, keypad, touchscreen, or other suitable input devices. The I/O unit 225 may also send output to a display, printer, or other suitable output devices.

Although FIG. 2 illustrates one example of a computer system 200, various changes may be made to FIG. 2. For example, various components in FIG. 2 could be combined, further subdivided, or omitted and additional components could be added according to particular needs. As a particular example, while depicted as one system, the computer system 200 may include multiple computer system systems that may be remotely located.

FIG. 3 illustrates an example user computing device 300 according to embodiments of the present disclosure. The embodiment of the user computing device 300 illustrated in FIG. 3 is for illustration only, and the user computing devices 106-112 of FIG. 1 could have the same or similar configuration. However, user computing devices come in a wide variety of configurations, and FIG. 3 does not limit the scope of this disclosure to any particular implementation of an electronic device. As shown in FIG. 3, the user computing device 300 includes a communication interface (or circuit) 305, processor(s) 310, an input/output (I/O) interface 315, an input 325, a display 320, and a memory 330. The memory 330 includes an operating system (OS) 332 and one or more gaming applications 334.

The communication interface or circuit 305 supports communications with other systems or devices. For example, the communication interface 305 could include a network interface card or a wireless transceiver facilitating communications over the network 101. The communication interface 305 may support communications through any suitable physical or wireless communication link(s). For embodiments utilizing wireless communication, the communication interface 305 may receive an incoming RF signal via one or more antennas using a variety of wireless communication protocols, (e.g., Bluetooth, Wi-Fi, cellular, LTE communication protocols etc.).

The processor(s) 310 can include one or more processors or other processing devices and execute the OS 332 stored in the memory 330 in order to control the overall operation of the user computing device 300. The processor(s) 310 is also capable of executing gaming application(s) 334 resident in the memory 330, such as, program code for one or more gaming applications for performing human computing tasks, such as, for example, games that incentivize engagement in image analysis as discussed in greater detail below. For example, the gaming application may be downloaded to and run by the user computing device 300 or may be web-based and played by accessing a server, for example, computer system 200.

The processor(s) 310, communication interface 305 and/or memory 330 constitute the computing resources of the user computing device 300. The processor(s) 310 may include any suitable number(s) and type(s) of processors or other devices in any suitable arrangement. Example types of processor(s) 310 include microprocessors, microcontrollers, graphical processing units (GPUs), digital signal processors, field programmable gate arrays, application specific integrated circuits, and discrete circuitry.

The processor(s) 310 can move data into or out of the memory 330 as required by an executing process. The processor(s) 310 is also coupled to the I/O interface 315, which provides the user computing device 300 with the ability to connect to other devices, such as laptop computers and handheld computers. The I/O interface 315 provides a communication path between accessories and the processor(s) 310.

The processor(s) 310 is also coupled to the input 325 and the display 320. The operator of the user computing device 300 can use the input 325 to enter data and inputs into the user computing device 300. For example, the input 325 may be a touchscreen, button, keyboard, trackball, mouse, stylus, electronic pen, video game controller, etc. The display 320 may be a liquid crystal display, light emitting diode display, or other display capable of rendering text and/or at least limited graphics, such as from websites. The memory 330 is coupled to the processor(s) 310. Part of the memory 330 could include a random-access memory (RAM), and another part of the memory 330 could include a Flash memory or other read-only memory (ROM).

Although FIG. 3 illustrates one example of user computing device 300, various changes may be made to FIG. 3. For example, various components in FIG. 3 could be combined, further subdivided, or omitted and additional components could be added according to particular needs. As a particular example, the processor(s) 310 could be divided into multiple processors, such as one or more central processing units (CPUs) and one or more graphics processing units (GPUs). In another example, the display 320 may be externally connected to or not a part of the user computing device 300, such as for example, with a video game console or desktop computer.

Figure 4:
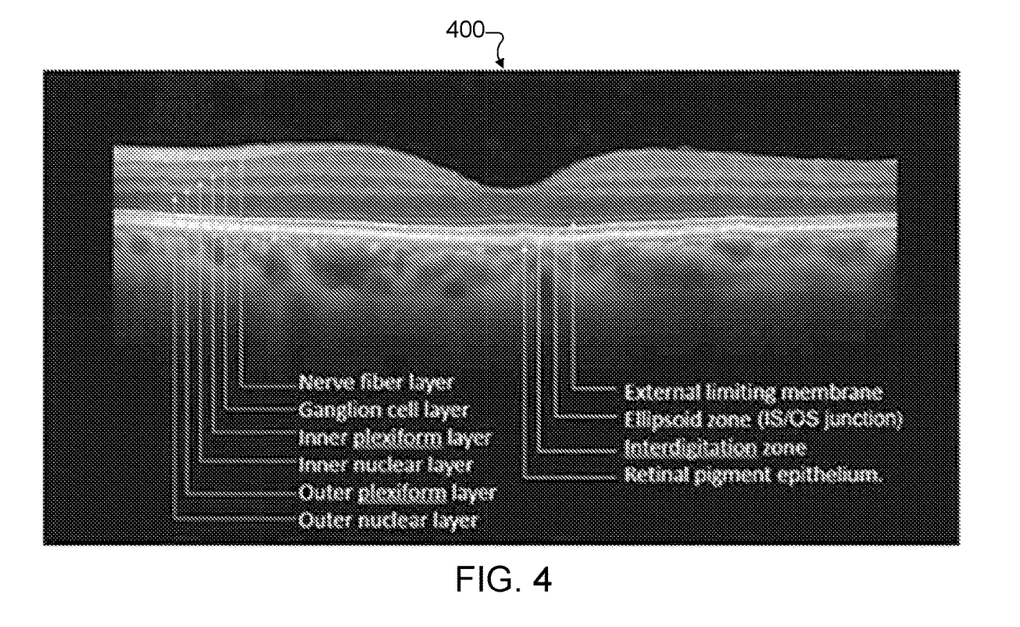
FIG. 4 illustrates an example OCT image of a normal retina and includes labels indicating the various structures within the retina tissue which may be analyzed in accordance with embodiments of the present disclosure.

FIG. 4 illustrates an example OCT image 400 of a normal retina and includes labels indicating the various structures within the retina tissue which may be analyzed in accordance with embodiments of the present disclosure. OCT images are generated by an OCT unit that can, noninvasively and without risk, capture two-dimensional images of the retina and be reconstructed to provide processed three-dimensional information as well. Using the OCT image 400, details of the retinal architecture can be captured and analyzed. For example, laser light reflected into the OCT machine to reveal surfaces and layers within the object being imaged and the retina can have a large number of cell types and many layers of material and anatomic interfaces.

OCT image analysis can help in the diagnosis and management of patients with degenerative AMD. However the challenges that researchers face in fully utilizing OCT to manage degenerative AMD patients are that 1) at the initial stages of the disease the OCT changes can be very subtle; 2) the progression of changes seen on OCT in patients with degenerative AMD can be difficult to detect and 3) the extent of possible changes seen on the OCT in patients with degenerative AMD can be very complex. To address these challenges, various embodiments of the present disclosure provide image analysis solutions that utilize interactive applications (such as video games or other applications requiring or using human input) to gain human intuition and leverage that human intuition in connection with machine learning to correctly identify structures (or the absence thereof) in an image.

Figure 5A:
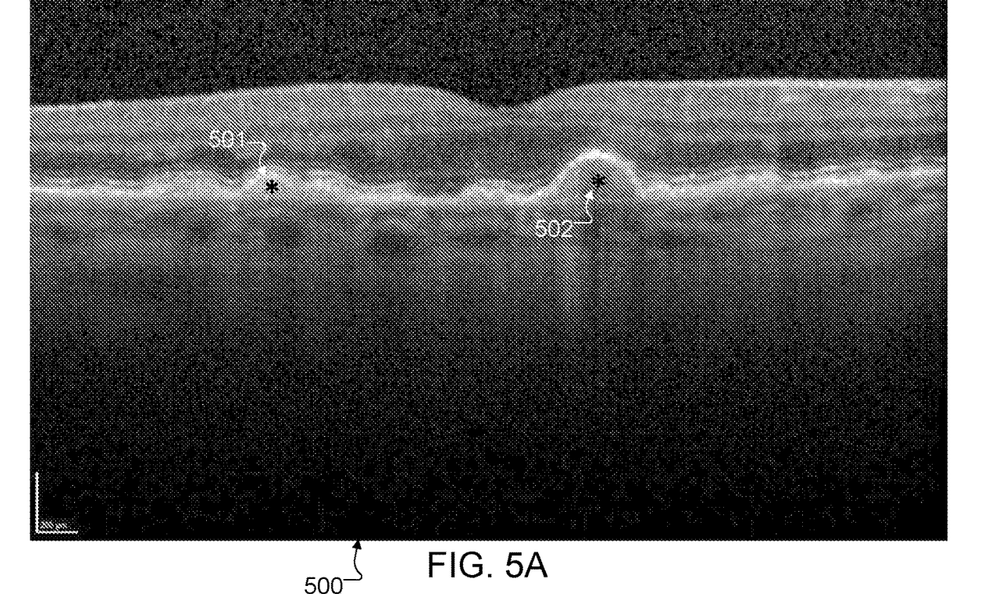
FIGS. 5A and 5B illustrate example OCT images of a retina with AMD which may be analyzed in accordance with embodiments of the present disclosure.
Figure 5B:
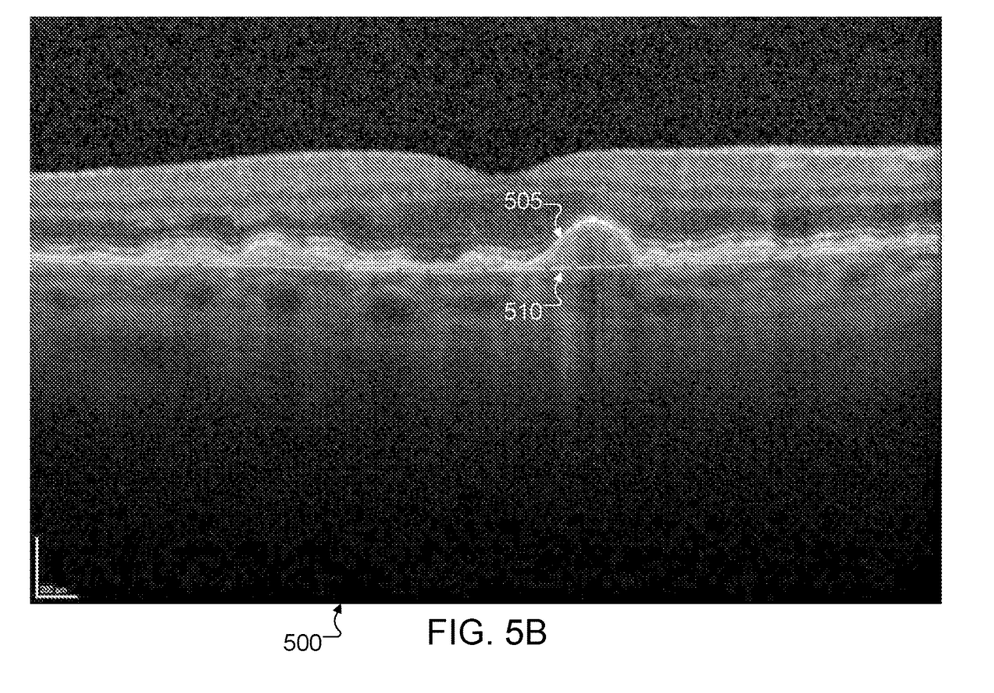

FIGS. 5A and 5B are example OCT images 500 of a retina with AMD which may be analyzed in accordance with embodiments of the present disclosure. In particular, FIG. 5A is annotated with has asterisks (501 and 502) identifying bumps which represent drusen material from a degenerative AMD subject. FIG. 5B is the same image but showing upper and lower lines (505 and 510, respectively) generated as a result of line segmentation having performed for use in measuring the volume of the drusen material in the image.

The amount of the material, (e.g., number of bumps, volume of material, average size of bumps, reflective index of the material, etc.) may be medically significant (relevant to progression or regression of the disease). For example, each OCT image is generated at 5 microns or smaller in thickness and approximately 90 such OCT images, or more, are generated per eye. While some of the images can be processed by machine run algorithms, these image analysis techniques can be highly inaccurate. Moreover, often times the image may be out of focus, for example, if the patient is moving or low-resolution images (e.g., 750 pixels) that do not contain significant enough amounts of information for machine run algorithms to generate accurate results. In some instances, the layers to be quantitated may be missing or very small (e.g., due to atrophy). As a result, the machine run algorithms may not provide enough useful information, for example, by not identifying exactly where the segmentation between the layers is. Often, the lines 505 and 510 are inserted above or below where the actual segment between the layers is present in the image. As a result, technicians manually fix the placement of the lines 505 and 510, which is very labor intensive particularly given the scope and quantity of the images. Given the need for accurate image analysis to determine efficacy of certain medications, many opportunities to precisely qualify the medication efficacy are missed because of the cost or performed with only a high level of detail.

Figure 6:
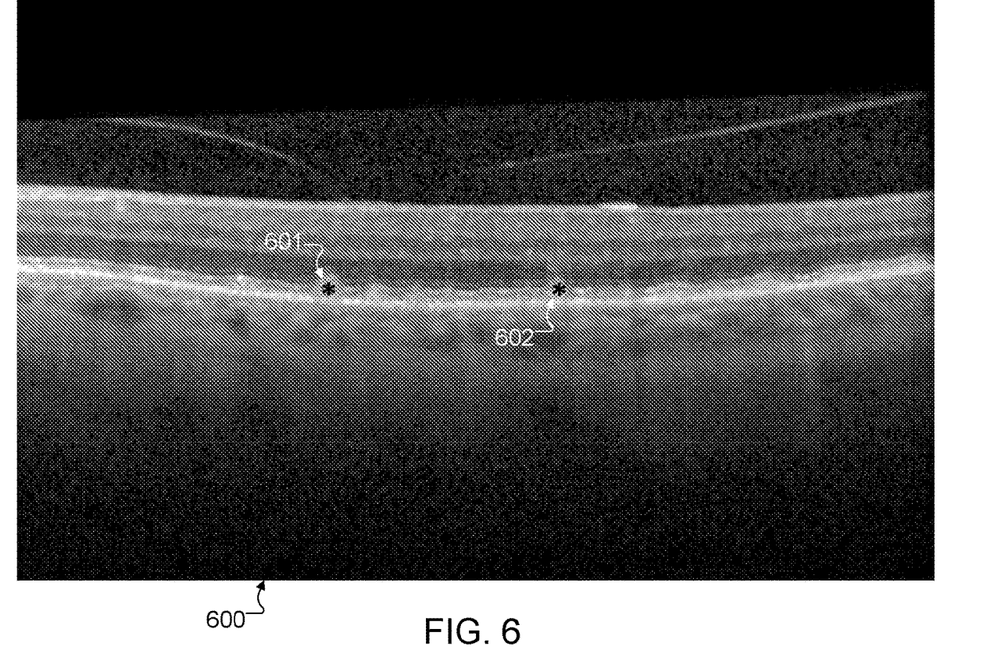
FIG. 6 illustrates another example OCT image showing subretinal drusen material having variability in amount and appearance but consistency in anatomic location which may be analyzed in accordance with embodiments of the present disclosure.

This volume-based analysis is just one example. For just macular degeneration, numerous additional analyses may need to be performed at various stages of the disease. For example, the image analysis performed in various embodiments can be to provide correct identification of the material, quantity of material, consistency of identification, thickness of the material in a layer of material, the absence of at least a portion of a layer of material, and any additional granularity in the identification and classification of the material of interest. As one example of the variety in images to be analyzed for just AMD, FIG. 6 illustrates another example OCT image showing subretinal drusen material (as denoted by the asterisks labeled 601 and 602) having variability in amount and appearance which may be analyzed in accordance with embodiments of the present disclosure.

Figure 7:
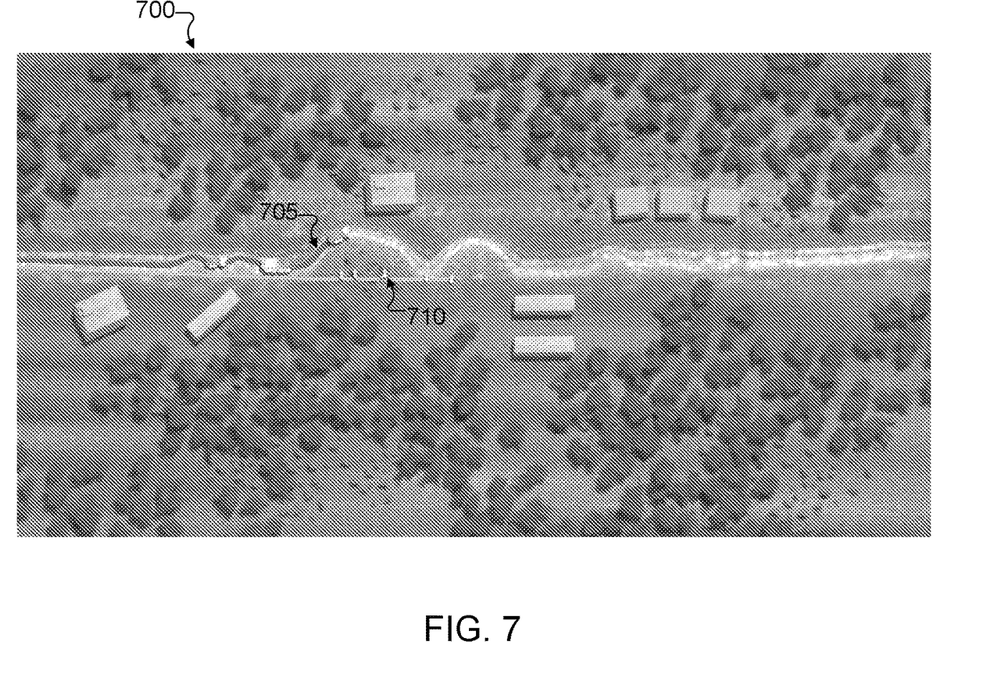
FIG. 7 illustrates a user interface for a gaming application that is used to generate human computational data in accordance with various embodiments of the present disclosure.

FIG. 7 illustrates a user interface (UI) 700 for a gaming application (such as gaming application 334) that is used to generate the human computational data 240 in accordance with various embodiments of the present disclosure. In this illustrative example, the inverted color scans of relevant portions (i.e., retinal tissue layers) of the OCT image, such as illustrated in FIGS. 5A and 5B, are displayed on the UI 700 as roads or trails that enemy robots will travel (e.g., as denoted by upper and lower lines).

In playing the game, the user engages in the macular degeneration research by encouraging the creation of the upper and lower lines 705 and 710 defining the drusen volume within a given scan. This provided a constrained playfield, modeled after tower defense games where players would defend predefined paths by placing towers. The users are able to place points as "towers", for defense. After defining the line/towers, the enemy robots travel the path and the closer the player was to the correct lines, the higher score the player receives. Additional decoration such as trees and buildings are added in the upper and lower regions of the intended playfield to provide more of a gaming experience.

For an image which a defined (e.g., computer generated or technician generated) solution exists, the enemy robots follow the optimal routes defined by the manual corrected OCT analysis. Players, unaware of the optimal analysis, place nodes to define an upper and lower line to mirror the "roads" the enemy robots will follow. Upon defining their lines, the players submit the information which is sent to an online database storing the image solutions. The players watch the robots walk along their respective paths, leaving a trail behind to visually train players on the types of features (e.g., segments and layers in the retina) to follow in future levels representing new OCT scans. As the robots walk the roads, targeting lasers damage the robots depending on the overall accuracy of the line. The closer players place their nodes to the optimal path, the more damage the lasers do, with perfect placement eliminating all enemies.

After completing an image, the players receive a final scoring report detailing their accuracy. Accuracy extends from keeping their defined lines within a given number of units, which translated to the user as direct hits, solid hits, partial hits, and misses. After receiving their score, players proceed to the next stage where they interact with a new image with this process repeating for several images.

Figure 8A:
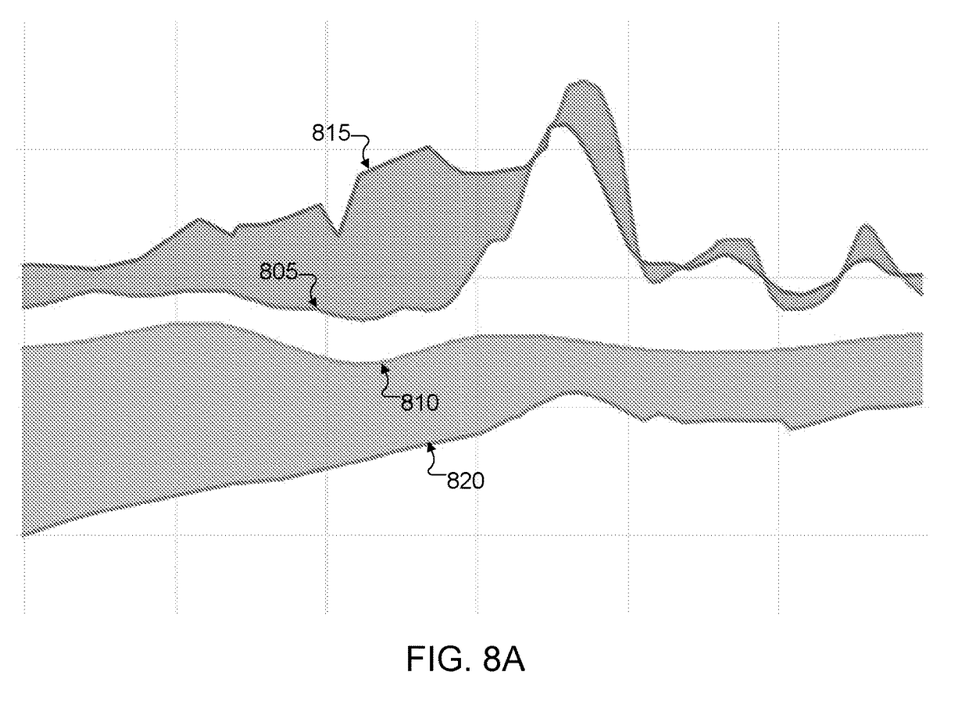
FIGS. 8A and 8B are graphs illustrating example mean error results for a set of players playing their first and seventh images, respectively in accordance with various embodiments of the present disclosure.
Figure 8B:
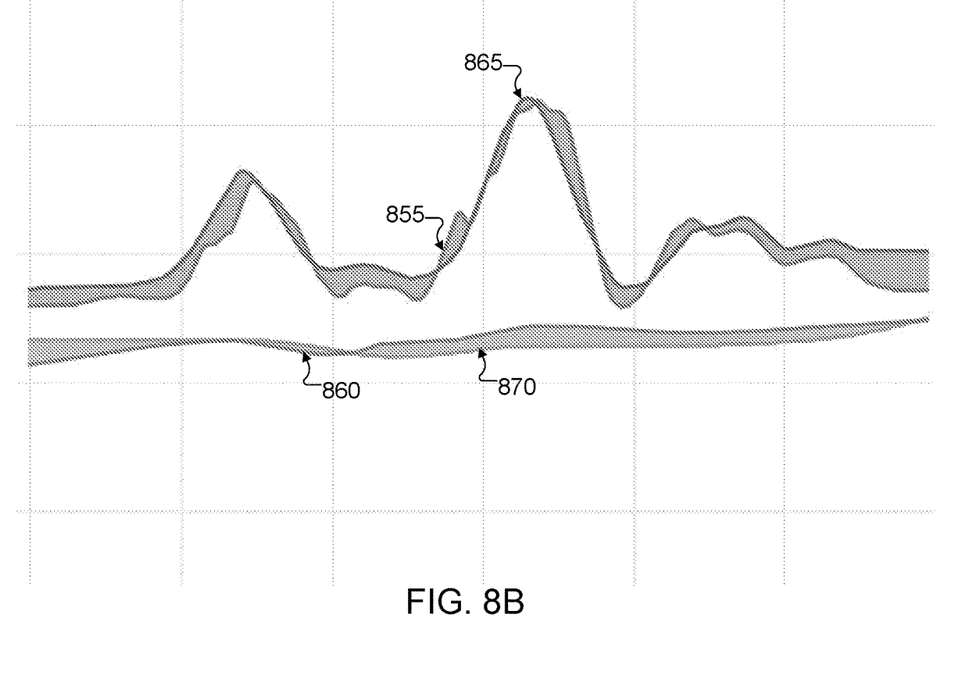

FIGS. 8A and 8B are graphs illustrating example mean error results for a set of players playing their first and seventh images, respectively in accordance with various embodiments of the present disclosure.

In various embodiments, the results of the gameplay are processed, for example, by the computing system to determine the accuracy of results and/or improve machine learning image analysis. For example, as depicted by the example illustrated by FIGS. 8A and 8B, the same images are played in sequential order. For each image, the average results from the set of all (e.g., 500 players) for each image is calculated. Then, to determine the error between the known solution and this average user position is calculated. At the outset, the players are fairly poor at identifying the correct locations of the layers in the image as illustrated in FIG. 8A. As depicted, the average player position for the top and bottom lines (815 and 820, respectively) is quite different than the position for the top and bottom lines (805 and 810, respectively) for the known solution for the first image. The shaded portions between the lines represent the error or deviation. However, embodiments of the present disclosure recognize that this error decreases overtime, for example, by the seventh image the results are reasonably accurate, for example, about a pixel difference, which is consistent with the range of accuracy in professional image analyzers. As depicted in FIG. 8B, the average player position for the top and bottom lines (865 and 870, respectively) much more closely tracks the position for the top and bottom lines (855 and 860, respectively) for the known solution for the seventh image. While illustrated as a line, in other embodiments, the user inputs in the image may form any other pattern or shape (e.g., circle, rectangle, etc.) for other types of objects or aspects thereof in the image being analyzed.

As a result, after such a training phase were results are compared against the known solution, the data from subsequent image analyses can be used as a reliable potential solution for the image that does not have an accepted or professionally determined solution. For example, for each image, the results of several analyses are averaged to determine the final solution. As part of this averaging process, the results data set may be limited to relevant results by, for example, discarding proposed solutions that fall at least a predetermined or weighted threshold above or below from the mean results for each point along the lines (i.e., obviously incorrect solutions) and/or removing all results for a user ID associated with the unreliable results.

To evaluate the performance of the human-generated results, a subset of the images that have known solutions are reserved and not used for generating the training data. With enough known solutions, the subset known solutions can be compared against the human-generated solutions for the same images to determine whether the overall set of generated training data is reliable and/or ascertain a rate of error or standard deviation that can be extrapolated to the overall training dataset.

In one or more embodiments, these results are used by themselves as the proposed solution and/or form human computational data, such as training data, that can be used as inputs to improve a machine learning algorithm that performs additional image analysis. As such, the gamification provides a mechanism to insert human intuition or human computation into the image analysis. This gamification not only trains users to perform image analysis but also the processing of the result data increases the accuracy of the ultimate proposed solution. Going one step further, in some embodiments, gamification is used as a training methodology to train technicians (i.e., professional image analyzers) on how to analyze the images. In other words, these embodiments use the game as a tool to teach technicians in reading centers how to analyze the images.

In additional embodiments, looking at the line generation of the image analysis, the lower line is relatively straight and receives fewer inputs to denote the curve of the line. However, at the location of the bumps, which are more medically relevant, several additional points are placed on the upper line to approximate the curve around the bump. Thus, not only is the location and/or slope curve relevant, the number of points entered to approximate positions on the curve can be used to identify potential areas of interest in the image. With the potential areas of interest identified, additional image analyses can be run just on that area of the image, for example, using the game-based analysis approach, flagged for review or fine-tuning by medical professionals, or used as an input for machine learning. In so doing, embodiments of the present disclosure generate meta-level data for the image analysis. Presently, machine learning algorithms process the image data, for example, passing a filter, such as convolution filters or color filters, over the image data for image analysis, with little ability to identify the relevance of areas in the image. Using the inputs from the game-based analysis, embodiments of the present discourse generate a heat-map image showing the density of dots or a derivative of points on average and provide this meta-level data to a machine learning algorithm. Using this input, the machine learning algorithm can identify that particular areas of the image are more relevant and perform additional processing (e.g., iterative processing) thereon, rather than wasting processing resources on less relevant areas such as normal tissue layer interfaces, noise, or background pixels.

Various embodiments of the present disclosure utilize several filter steps in real-time image analysis. For example, steps of edge detection, grayscale, color, density filters, derivative filters, etc. can be performed by the machine learning algorithm in any order. Additionally, for these embodiments, the present disclosure includes a "human intuition" filter as one or more of the steps in the image analysis. Providing these human intuition inputs to the algorithm can provide suggestions or mutations that allow the solutions provided machine learning algorithm to jump up a level in accuracy. Accordingly, in addition to or instead of assisting in identifying areas of interest/removing areas of non-interest, the generated meta-level data provides an additional input into the machine learning algorithm that indicates where the crowdsourced or human intuition data shows the characteristics of a given line. As discussed in the example above, the average position data for points placed by user input is viewable as a heat-map image. This generates a new data set that provides another layer of information captured by user input. Thus, the meta-level data can not only provide indicators of the relevant areas of the image, but also can providing insight about any given pixel. This, for example, assists the machine learning algorithm in identifying how to change the slope of the line when placing a next point.

Additionally, some embodiments provide a methodology to train an algorithm to identify the human intuition input or filter. For example, in deep neural networks, each layer of the deep neural network adds additional complexity or robustness. Using the data about where the user inputs occur in their image analysis (e.g., as a set of training data), embodiments of the present disclosure generate an algorithm that can identify points or curves in a manner similar to the way the human would identify the points or curves. Then in these embodiments, this "human layer" generation is used to improve the overall machine learning algorithm to remove the need for human input in the image analysis.

Figure 9:
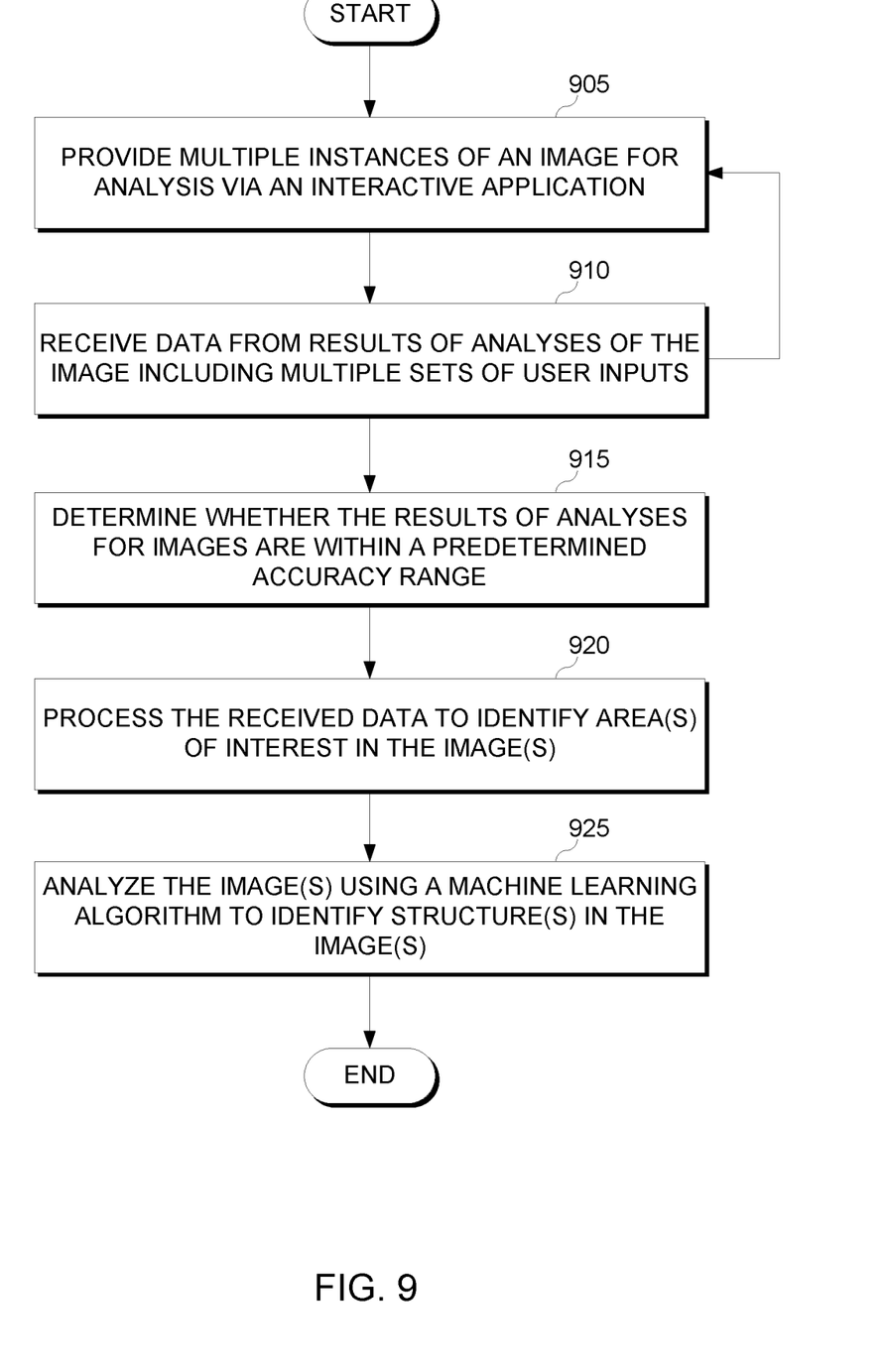
FIG. 9 illustrates an example flowchart of a process for analyzing an image in accordance with various embodiments of the present disclosure.

FIG. 9 illustrates an example of a process for analyzing an image in accordance with various embodiments of the present disclosure. For example, the process depicted in FIG. 9 is described as implemented by the server 200 in FIG. 2; the process may also be implemented by any of the server systems 102-104 in FIG. 1, and different servers systems may perform any number or portion of the steps of the process, collectively referred to herein as the system.

The process begins with the system providing multiple instances of an image for analysis via an interactive application (operation 905). In operation 905, the system may provide the respective instances of the image via respective instances of an interactive application designed for analysis of the image. In various embodiments, the interactive application is a gaming application (e.g., such as gaming application 334) and includes a user interface representative of the image such as user interface 700 to receive multiple sets of user inputs per image analyzed via the interactive application.

Thereafter, the system receives data from results of analyses of the image including multiple sets of user inputs (operation 910). In operation 910, the multiple sets of user inputs are from the analyses of the multiple instances of the image, respectively; the multiple sets of user inputs are input via the multiple instances of the interactive application, respectively; the multiple sets of user inputs are from the multiple users, respectively; and the multiple users associated with the multiple instances of the interactive application, respectively. For example, the system may receive these results from each of multiple of client devices 300 from each of multiple users in a collaborative computing or citizen science manner. Additionally, the system may repeat the providing of the multiple instances of the image and the receiving of the data from results of analyses of the image for each of multiple different images. For example, the system may provide sequential images of a same or similar type of structure to be analyzed, for example, in successive levels of a game, as discussed, for example, in connection with FIG. 7 above.

The system then determines whether the results of analyses for images are within a predetermined accuracy range (operation 915). For example, as discussed above, a first set or a subset of the different images provided for analysis may have a known solution and a second set or the remainder do not have a known solution. The system may use the successive providing of the images to train and or provide feedback (e.g., via the interactive application, for example, as a score in a game or as a direct results comparison) to players or technicians regarding those images which have known solutions. Further, as discussed above, the system may perform processing on the results data to filter out or weight user results that deviate from mean results (e.g., for images with or without a known solution) beyond the predetermined accuracy range. For example, the system may only use the received data from the results of analyses for images that are within the predetermined accuracy range or deviation for later processing. Alternatively, the system may apply a lower weight to results data outside of the predetermined accuracy range, which may, for example, be proportionate in some manner to the amount of deviation from the known solution. Additionally, as discussed above, the system may use additional techniques to determine accuracy. For example, the system may average results and discard or apply lower weight to those solutions outside of a standard or desired deviation therefrom.

Thereafter, system processes the received data to identify area(s) of interest in the image(s) (operation 920). In operation 920, the system identifies the area(s) of interest based on the multiple sets of user inputs. For example, the system may generate a filter for the image based on both the pattern of each of the user inputs input on the image and a quantity of the user inputs for the pattern in an area of the image. For example, both the pattern and quantity of inputs can be indicative of the area interest. For example, multiple inputs within a small area can be indicative of some aspect or feature of the image that is significant for processing of the image. This filter may be a first filter for a first layer of an aspect of the structure(s) present in the image and multiple such filters can be generated and combined for use in analyzing the image. For example, the system may generate a second filter for another aspect of the structures in the image based on both of another pattern of each of the user inputs input on the image and quantity of the user inputs for the other pattern in a second area of the image. In these embodiments, the structures could be any structures that are medically relevant such as layers of tissue in an organ, such as, for example, the human eye. The aspects associated with each of the filters could be, for example, lines representative of an amount of a substance (e.g., drusen) present or could be different aspects, such as different aspects of the image to be analyzed simultaneously, for example.

The system then analyzes the image(s) using a machine learning algorithm to identify structure(s) in the image(s) (operation 925). In operation 925, the system identifies the structure(s) based on the identified area(s) of interest present within the image using the processed user input results data. For example, the system may use the filter(s) for the image as an input for the machine learning algorithm to focus the machine learning algorithm on the areas of interest in the image. For example, in some embodiments, the system may encode the filter(s) into the image as a data point or channel in the image itself similar to, for example, the red green blue (RGB) channels of an image. In some embodiments, the system may segment the image using the filter to focus processing of the machine learning algorithm to the one or more areas of interest present within the image, for example, by removing areas outside of the areas of interest using the filter. This may be advantageous in embodiments where reduced image processing time or reduced processing resources (e.g., computing cycles or memory) are desirable. In other embodiments, the system may process the entire image via the machine learning algorithm and use the filter(s) to focus the machine learning algorithm for additional processing inputs on the areas of interest. This may be advantageous in embodiments where precision and accuracy are more important that reduced image processing time or processing resources.

In various embodiments, the system may use the processed user input results data with the machine learning algorithm to improve the machine learning algorithm. For example, the system may use the processed user input results data as training data to train the machine learning algorithm, and, with enough training data, train the machine learning algorithm to generate similar results data to use in various aspects of image analysis, for example, without requiring further the user image analysis. For example, the system may generate a machine learning model for identifying probable user inputs in the images using the processed user input results data as training data and applying the machine learning model to identify probable user inputs in other images to train the machine learning algorithm to process the other images without requiring the multiple sets of user inputs. In various embodiments, the system may, additionally or alternatively, use the processed user input results data in other portions of the machine learning algorithm to modify the training or development of and/or improve machine learning algorithm to perform the image processing. For example, the system may use the processed user input results data (e.g., the user identified solutions for structure(s) or area(s) of interest in the image) to weight or error correct solutions proposed by the machine learning algorithm. In other examples, the system may modify the training of the machine learning algorithm itself via the processed user input results data.

In various embodiments, the system may analyze images over time to generate important statistical data or results. For example, the image may be of a portion of a bodily organ and this portion of a bodily organ may be imaged over time. In this example, the system may analyze these images provided over time to track a status of the structure(s) in the image over time and generate information using the tracked status. For example, this information can advantageously be used to monitor treatment efficacy for a disease of the bodily organ over the time and track progression of a disease of the bodily organ over the time as discussed in greater detail below.

Although FIG. 9 illustrates an example of process for analyzing an image, various changes could be made to FIG. 9. For example, while shown as a series of steps, various steps in each figure could overlap, occur in parallel, occur in a different order, or occur multiple times. In another example, steps may be omitted or replaced by other steps.

Thus, various embodiments of the present disclosure provide an algorithm for generating a solution for individual image analysis and others provide a manner for generating inputs to provide a portion of the solution. For example, in some embodiments, the algorithm is trained to provide the solution in one step, and in others, a meta-level data set is generated first (e.g., by using human intuition computation or by a machine learning algorithm using training data) and use the algorithm to provide the solution using the meta-level data set.

Based on these substantial improvements to the image analysis, including decreasing the cost and time in performing the image analysis, significant increases in both the number of images processed and accuracy and precision in image processing are obtained. These analyzed images are then used to be used to validate (i.e., provide objective quantitative measurements) results of medical studies, such as drug trials, to determine treatment efficacy and better track progression of the disease for improved medical research. Other outcomes of the image analysis include detection of novel aspects on the image that have not been previously identified that provide insight to disease pathology or progression.

It is important to note that while the use of OCT images to for AMD analysis is discussed herein, this is just for an example illustrating possible applications of the embodiments of the present disclosure. Both OCT images and AMD analysis are example implementations, applications, or use cases and not intended as a limitation on the many different number and type of implementations, applications, or use cases that may be utilized in accordance with the embodiments of the present disclosure. Any type of images may be analyzed for any medical or other structural identification reasons in accordance with the principles of the present disclosure.

For example, without limitation, any type of OCT image analysis such as retina, cornea, lens, heart, lungs, other organs, can be used etc. Other medical diagnoses or purposes such as diabetic retinopathy, other retinal diseases, or OCT angiography (e.g., using consecutive images to track blood flow in blood vessels and generate images of blood flow to identify abnormalities in blood flow) may be utilized in the embodiments of the present disclosure. Furthermore, other types of images may be utilized in the embodiments of the present disclosure including but not limited to retinal fundus images, fluorescein angiographic images, indocyanine green angiographic images and ultrasound images. In addition, other images related to medicine may be utilized in the embodiments of the present disclosure including computerized tomography scans, magnetic resonance imaging, positive emission tomography, or x-rays may be amenable to the described analysis.

In one embodiment, a method for analyzing an image is provided. The method includes providing, via multiple instances of an interactive application for analysis of the image, multiple instances, respectively, of the image and receiving, via the interactive application, data from results of analyses of the image including multiple sets of user inputs from the analyses of the multiple instances of the image, respectively. The multiple sets of user inputs are input via the multiple instances of the interactive application, respectively; the multiple sets of user inputs are from multiple users, respectively; and the multiple users are associated with the multiple instances of the interactive application, respectively. The method further includes processing the received data to identify one or more areas of interest present within the image based on the multiple sets of user inputs and analyzing the image using a machine learning algorithm to identify one or more structures present in the image based on the identified one or more areas of interest present within the image.

In another embodiment, a system for analyzing an image is provided. The system includes a communication interface and a processor operably connected to the communication interface. The communication interface is configured to provide, via multiple instances of an interactive application for analysis of the image, multiple instances, respectively, of the image and receive, via the interactive application, data from results of analyses of the image including multiple sets of user inputs from the analyses of the multiple instances of the image, respectively. The multiple sets of user inputs are input via the multiple instances of the interactive application, respectively; the multiple sets of user inputs are from multiple users, respectively; and the multiple users are associated with the multiple instances of the interactive application, respectively. The processor is configured to process the received data to identify one or more areas of interest present within the image based on the multiple sets of user inputs and analyze the image using a machine learning algorithm to identify one or more structures present in the image based on the identified one or more areas of interest present within the image.

In yet another embodiment, a non-transitory, computer-readable medium for analyzing an image is provided. The computer-readable medium comprises program code that, when executed by a processor of a system, causes the system to provide, via multiple instances of an interactive application for analysis of the image, multiple instances, respectively, of the image and receive, via the interactive application, data from results of analyses of the image including multiple sets of user inputs from the analyses of the multiple instances of the image, respectively. The multiple sets of user inputs are input via the multiple instances of the interactive application, respectively; the multiple sets of user inputs are from multiple users, respectively; and the multiple users are associated with the multiple instances of the interactive application, respectively. The computer-readable medium further comprises program code that, when executed by a processor of a system, causes the system to process the received data to identify one or more areas of interest present within the image based on the multiple sets of user inputs and analyze the image using a machine learning algorithm to identify one or more structures present in the image based on the identified one or more areas of interest present within the image.

In any of the above examples and embodiments, the method further includes repeating the providing of the multiple instances of the image and the receiving of the data from results of analyses of the image for each of multiple different images including the one or more structures, wherein a first set of the multiple different images have a known solution and a second set do not have a known solution; determining, per user in the multiple users, whether the results of analyses for images from the first set are within a predetermined accuracy range; and generating feedback regarding whether the results of analyses for images from the first set are within the predetermined accuracy range.

In any of the above examples and embodiments, the processing of the received data to identify one or more areas of interest comprises generating a filter for the image based on both a pattern of the user inputs input on the image and quantity of the user inputs for the pattern in an area of the image; and the analyzing of the image using the machine learning algorithm comprises using the filter for the image as an input for the machine learning algorithm.

In any of the above examples and embodiments, the filter is a first filter for a first layer of an aspect of the one or more structures present in the image; processing the received data to identify one or more areas of interest comprises generating a second filter for the image based on both a second pattern of the user inputs input on the image and quantity of the user inputs for the second pattern in a second area of the image, the second filter being for a second layer of the aspect of the one or more structures present in the image; and analyzing the image using the machine learning algorithm further comprises combining the first and second filters to form a multiple layer filter and using the multiple layer filter for the image as an input for the machine learning algorithm.

In any of the above examples and embodiments, using the filter for the image as an input for the machine learning algorithm comprises segmenting the image using the filter to focus processing of the machine learning algorithm to the one or more areas of interest present within the image.

In any of the above examples and embodiments, the method further includes repeating the providing of the multiple instances of the image and the receiving of the data from results of analyses of the image for each of multiple different images including the one or more structures; the analyzing of the image using the machine learning algorithm includes generating a machine learning model for identifying probable user inputs in the multiple different images using the results from the multiple different images as training data; and applying the machine learning model to identify probable user inputs in other images to train the machine learning algorithm to process the other images without requiring the multiple sets of user inputs.

In any of the above examples and embodiments, the analyzing of the image using the machine learning algorithm includes training the machine learning algorithm based on the identified one or more areas of interest present within the image; and analyzing the image using the trained machine learning algorithm to identify the one or more structures present in the image.

In any of the above examples and embodiments, the method further includes the interactive application is a gaming application and includes a user interface representative of the image and the multiple sets of user inputs are input into the user interface representative of the image.

In any of the above examples and embodiments, the image is of a portion of a bodily organ, and the analyzing of the image using a machine learning algorithm to identify one or more structures present in the image includes tracking a status of the one or more structures over time by processing additional images of the one or more structures using the machine learning algorithm; and generating information using the tracked status for at least one of (i) monitoring treatment efficacy for a disease of the bodily organ over the time and (ii) tracking progression of a disease of the bodily organ over the time.

It may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "such as," when used among terms, means that the latter recited term(s) is(are) example(s) and not limitation(s) of the earlier recited term. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described herein can be implemented or supported by one or more computer programs, each of which is formed from computer readable program code and embodied in a computer-readable medium. The terms "application" and "program" refer to one or more computer programs, software components, sets of instructions, procedures, functions, objects, classes, instances, related data, or a portion thereof adapted for implementation in a suitable computer readable program code. The phrase "computer-readable program code" includes any type of computer code, including source code, object code, and executable code. The phrase "computer-readable medium" includes any type of medium capable of being accessed by a computer, such as read-only memory (ROM), random access memory (RAM), a hard disk drive, a compact disc (CD), a digital video disc (DVD), or any other type of memory. A "non-transitory" computer-readable medium excludes wired, wireless, optical, or other communication links that transport transitory electrical or other signals. A non-transitory, computer-readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases. Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for analyzing an image, the method comprising:
providing, via multiple instances of an interactive application for analysis of the image, multiple instances, respectively, of the image;
receiving, via the interactive application, data from results of analyses of the image including multiple sets of user inputs from the analyses of the multiple instances of the image, respectively; the multiple sets of user inputs input via the multiple instances of the interactive application, respectively; the multiple sets of user inputs being from multiple users, respectively; the multiple users associated with the multiple instances of the interactive application, respectively;
identifying, based on the received data, points in the image associated with the user inputs, respectively, of the multiple sets of user inputs;
identifying one or more areas of interest in the image at least based on the identified points that are associated with at least a subset of the multiple sets of user inputs, each set of the subset of the multiple sets of user inputs including multiple inputs associated with the one or more areas of interest;
generating a filter for a first of the one or more areas of interest in the image based on both a pattern of the points in the image associated with the user inputs and quantity of the points in the image associated with the user inputs for the pattern in the first area of the image; and
analyzing the image using a machine learning algorithm, using the filter for the image as an input for the machine learning algorithm, to identify one or more structures present in the image based on the identified one or more areas of interest in the image.

2. The method of claim 1, further comprising:
repeating the providing of the multiple instances of the image and the receiving of the data from results of analyses of the image for each of multiple different images including the one or more structures, wherein a first set of the multiple different images have a known solution and a second set do not have a known solution;
determining, per user in the multiple users, whether the results of analyses for images from the first set are within a predetermined accuracy range; and
generating feedback regarding whether the results of analyses for images from the first set are within the predetermined accuracy range.

3. The method of claim 1, wherein:
the filter is a first filter for a first layer of an aspect of the one or more structures present in the image;
the method further comprises generating a second filter for a second of the one or more areas of interest in the image based on both a second pattern of the points in the image associated with the user inputs and quantity of the points in the image associated with the user inputs for the second pattern in the second area of the image, the second filter being for a second layer of the aspect of the one or more structures present in the image; and
analyzing the image using the machine learning algorithm further comprises combining the first and second filters to form a multiple layer filter for the image and using the multiple layer filter for the image as an input for the machine learning algorithm.

4. The method of claim 1, wherein using the filter for the image as an input for the machine learning algorithm comprises segmenting the image using the filter to focus processing of the machine learning algorithm to the one or more areas of interest in the image.

5. The method of claim 1, further comprising:
repeating the providing of the multiple instances of the image and the receiving of the data from results of analyses of the image for each of multiple different images including the one or more structures;
wherein analyzing the image using the machine learning algorithm comprises:
generating a machine learning model for identifying probable user inputs in the multiple different images using the results from the multiple different images as training data; and
applying the machine learning model to identify probable user inputs in other images to train the machine learning algorithm to process the other images without requiring the multiple sets of user inputs.

6. The method of claim 1, wherein analyzing the image using the machine learning algorithm comprises:
training the machine learning algorithm based on the identified one or more areas of interest in the image; and
analyzing the image using the trained machine learning algorithm to identify the one or more structures present in the image.

7. The method of claim 1, wherein the interactive application is a gaming application and includes a user interface representative of the image and the multiple sets of user inputs are input into the user interface representative of the image.

8. The method of claim 1, wherein:
the image is of a portion of a bodily organ, and
analyzing the image using the machine learning algorithm to identify the one or more structures present in the image comprises:
tracking a status of the one or more structures over time by processing additional images of the one or more structures using the machine learning algorithm; and
generating information using the tracked status for at least one of (i) monitoring treatment efficacy for a disease of the bodily organ over the time and (ii) tracking progression of a disease of the bodily organ over the time.

9. A system for analyzing an image, the system comprising:
a communication interface configured to:
provide, via multiple instances of an interactive application for analysis of the image, multiple instances, respectively, of the image; and
receive, via the interactive application, data from results of analyses of the image including multiple sets of user inputs from the analyses of the multiple instances of the image, respectively; the multiple sets of user inputs input via the multiple instances of the interactive application, respectively; the multiple sets of user inputs being from multiple users, respectively; the multiple users associated with the multiple instances of the interactive application, respectively; and a processor operably connected to the communication interface, the processor configured to:
- identify, based on the received data, points in the image associated with the user inputs, respectively, of the multiple sets of user inputs;
- identify one or more areas of interest in the image at least based on the identified points that are associated with at least a subset of the multiple sets of user inputs, each set of the subset of the multiple sets of user inputs including multiple inputs associated with the one or more areas of interest;
- generate a filter for a first of the one or more areas of interest in the image based on both a pattern of the points in the image associated with the user inputs and quantity of the points in the image associated with the user inputs for the pattern in the first area of the image; and
- analyze the image using a machine learning algorithm, using the filter for the image as an input for the machine learning algorithm, to identify one or more structures present in the image based on the identified one or more areas of interest in the image.

10. The system of claim 9, wherein:
the communication interface is configured to repeat the providing of the multiple instances of the image and the receiving of the data from results of analyses of the image for each of multiple different images including the one or more structures;
a first set of the multiple different images have a known solution and a second set do not have a known solution;
the processor is further configured to:
- determine, per user in the multiple users, whether the results of analyses for images from the first set are within a predetermined accuracy range; and
- generate feedback regarding whether the results of analyses for images from the first set are within the predetermined accuracy range.

11. The system of claim 9, wherein:
the filter is a first filter for a first layer of an aspect of the one or more structures present in the image;
the processor is further configured to generate a second filter for a second of the one or more areas of interest in the image based on both a second pattern of the points in the image associated with the user inputs and quantity of the points in the image associated with the user inputs for the second pattern in the second area of the image, the second filter being for a second layer of the aspect of the one or more structures present in the image; and
in analyzing the image using the machine learning algorithm, the processor is configured to combine the first and second filters to form a multiple layer filter for the image and using the multiple layer filter for the image as an input for the machine learning algorithm.

12. The system of claim 9, wherein in using the filter for the image as an input for the machine learning algorithm, the processor is configured to segment the image using the filter to focus processing of the machine learning algorithm to the one or more areas of interest in the image.

13. The system of claim 9, wherein:
the communication interface is configured to repeat the providing of the multiple instances of the image and the receiving of the data from results of analyses of the image for each of multiple different images including the one or more structures; and
in analyzing the image using the machine learning algorithm, the processor is configured to:
- generate a machine learning model for identifying probable user inputs in the multiple different images using the results from the multiple different images as training data; and
- apply the machine learning model to identify probable user inputs in other images to train the machine learning algorithm to process the other images without requiring the multiple sets of user inputs.

14. The system of claim 9, wherein in analyzing the image using the machine learning algorithm, the processor is configured to:
- train the machine learning algorithm based on the identified one or more areas of interest in the image; and
- analyze the image using the trained machine learning algorithm to identify the one or more structures present in the image.

15. The system of claim 9, wherein the interactive application is a gaming application and includes a user interface representative of the image and the multiple sets of user inputs are input into the user interface representative of the image.

16. The system of claim 9, wherein:
the image is of a portion of a bodily organ, and
in analyzing the image using the machine learning algorithm to identify the one or more structures present in the image, the processor is configured to:
- track a status of the one or more structures over time by processing additional images of the one or more structures using the machine learning algorithm; and
- generate information using the tracked status for at least one of (i) monitoring treatment efficacy for a disease of the bodily organ over the time and (ii) tracking progression of a disease of the bodily organ over the time.

17. A non-transitory, computer-readable medium for analyzing an image comprising program code that, when executed by a processor of a system, causes the system to:
- provide, via multiple instances of an interactive application for analysis of the image, multiple instances, respectively, of the image;
- receive, via the interactive application, data from results of analyses of the image including multiple sets of user inputs from the analyses of the multiple instances of the image, respectively; the multiple sets of user inputs input via the multiple instances of the interactive application, respectively; the multiple sets of user inputs being from multiple users, respectively; the multiple users associated with the multiple instances of the interactive application, respectively;
- identify, based on the received data, points in the image associated with the user inputs, respectively, of the multiple sets of user inputs;
- identify one or more areas of interest in the image at least based on the identified points that are associated with at least a subset of the multiple sets of user inputs, each set of the subset of the multiple sets of user inputs including multiple inputs associated with the one or more areas of interest;
- generate a filter for a first of the one or more areas of interest in the image based on both a pattern of the points in the image associated with the user inputs and quantity of the points in the image associated with the user inputs for the pattern in the first area of the image; and
- analyze the image using a machine learning algorithm, using the filter for the image as an input for the machine learning algorithm, to identify one or more structures present in the image based on the identified one or more areas of interest in the image.

18. The computer-readable medium of claim 17, further comprising program code that, when executed by the processor of the system, causes the system to:
repeat the providing of the multiple instances of the image and the receiving of the data from results of analyses of the image for each of multiple different images including the one or more structures, wherein a first set of the multiple different images have a known solution and a second set do not have a known solution;
determine, per user in the multiple users, whether the results of analyses for images from the first set are within a predetermined accuracy range; and
generate feedback regarding whether the results of analyses for images from the first set are within the predetermined accuracy range.

19. The computer-readable medium of claim 17, wherein:
the filter is a first filter for a first layer of an aspect of the one or more structures present in the image;
the computer-readable medium further comprises program code that, when executed by the processor of the system, causes the system to generate a second filter for a second of the one or more areas of interest in the image based on both a second pattern of the points in the image associated with the user inputs and quantity of the points in the image associated with the user inputs for the second pattern in the second area of the image, the second filter being for a second layer of the aspect of the one or more structures present in the image; and
the program code for analyzing the image using the machine learning algorithm, comprises program code that, when executed by the processor of the system, causes the system to combine the first and second filters to form a multiple layer filter for the image and using the multiple layer filter for the image as an input for the machine learning algorithm.

20. The computer-readable medium of claim 17, wherein the program code for using the filter for the image as an input for the machine learning algorithm, comprises program code that, when executed by the processor of the system, causes the system to segment the image using the filter to focus processing of the machine learning algorithm to the one or more areas of interest in the image.

21. The computer-readable medium of claim 17, further comprising program code that, when executed by the processor of the system, causes the system to repeat the providing of the multiple instances of the image and the receiving of the data from results of analyses of the image for each of multiple different images including the one or more structures;
wherein the program code for analyzing the image using the machine learning algorithm, comprises program code that, when executed by the processor of the system, causes the system to:
generate a machine learning model for identifying probable user inputs in the multiple different images using the results from the multiple different images as training data; and
apply the machine learning model to identify probable user inputs in other images to train the machine learning algorithm to process the other images without requiring the multiple sets of user inputs.

22. The computer-readable medium of claim 17, wherein the program code for analyzing the image using the machine learning algorithm, comprises program code that, when executed by the processor of the system, causes the system to:
train the machine learning algorithm based on the identified one or more areas of interest in the image; and
analyze the image using the trained machine learning algorithm to identify the one or more structures present in the image.

23. The computer-readable medium of claim 17, wherein the interactive application is a gaming application and includes a user interface representative of the image and the multiple sets of user inputs are input into the user interface representative of the image.

24. The computer-readable medium of claim 17, wherein:
the image is of a portion of a bodily organ, and
the program code for analyzing the image using the machine learning algorithm, comprises program code that, when executed by the processor of the system, causes the system to:
track a status of the one or more structures over time by processing additional images of the one or more structures using the machine learning algorithm; and
generate information using the tracked status for at least one of (i) monitoring treatment efficacy for a disease of the bodily organ over the time and (ii) tracking progression of a disease of the bodily organ over the time.

* * * * *